US012666387B2

(12) United States Patent
Keating et al.

(10) Patent No.: US 12,666,387 B2
(45) Date of Patent: Jun. 23, 2026

(54) MECHANISM FOR SIDELINK POSITIONING

(71) Applicant: Nokia Technologies Oy, Espoo (FI)

(72) Inventors: Ryan Keating, Naperville, IL (US);
Tao Tao, Shanghai (CN); Yong Liu,
Shanghai (CN); Jun Tan, Naperville, IL
(US)

(73) Assignee: NOKIA TECHNOLOGIES OY,
Espoo (FI)

( * ) Notice: Subject to any disclaimer, the term of this
patent is extended or adjusted under 35
U.S.C. 154(b) by 399 days.

(21) Appl. No.: 18/548,728

(22) PCT Filed: Mar. 6, 2021

(86) PCT No.: PCT/CN2021/079435
§ 371 (c)(1),
(2) Date: Sep. 1, 2023

(87) PCT Pub. No.: WO2022/187988
PCT Pub. Date: Sep. 15, 2022

(65) Prior Publication Data
US 2024/0147411 A1 May 2, 2024

(51) Int. Cl.
H04L 5/00 (2006.01)
H04W 64/00 (2009.01)
*H04W 92/18* (2009.01)

(52) U.S. Cl.
CPC ........... H04W 64/00 (2013.01); H04L 5/0048
(2013.01); *H04W 92/18* (2013.01)

(58) Field of Classification Search
None
See application file for complete search history.

(56) References Cited

U.S. PATENT DOCUMENTS 9,304,187 B2    4/2016  Jang et al.
9,998,856 B2    6/2018  Edge
10,327,106 B2   6/2019  Hwang et al.
(Continued)

FOREIGN PATENT DOCUMENTS

CN      109327901 A     2/2019
CN      110536234 A     12/2019
(Continued)

OTHER PUBLICATIONS

Extended European Search Report received for corresponding European Patent Application No. 21929471.7, dated Nov. 11, 2024, 8 pages.
(Continued)

*Primary Examiner* — Idowu O Osifade
(74) *Attorney, Agent, or Firm* — ISQUIRE PATTON BOGGS (US) LLP

(57) ABSTRACT

Embodiments of the present disclosure relate to a method, device, apparatus and computer readable medium for side-link positioning. According to embodiments of the present disclosure, a second device transmits information related to sidelink positioning to a first device. The information indicates that the second device is able to assist with the sidelink positioning and comprises assistance information for the sidelink positioning. The first device selects at least one proper device for the sidelink positioning based on the assistance information. In this way, it improves accuracy of the sidelink positioning.

18 Claims, 7 Drawing Sheets

(56) References Cited

U.S. PATENT DOCUMENTS

| | | | |
|---|---|---|---|
| 10,568,057 B2 | 2/2020 | Chae | |
| 2016/0095080 A1 | 3/2016 | Khoryaev et al. | |
| 2016/0095092 A1 | 3/2016 | Khoryaev et al. | |
| 2017/0150475 A1 | 5/2017 | Li et al. | |
| 2019/0230618 A1 | 7/2019 | Saur et al. | |
| 2022/0015057 A1* | 1/2022 | Bao ...................... | H04W 76/14 |

FOREIGN PATENT DOCUMENTS

| | | | |
|---|---|---|---|
| EP | 3644296 A1 | 4/2020 | |
| WO | 2019/154517 A1 | 8/2019 | |
| WO | 2019/197036 A1 | 10/2019 | |
| WO | 2020/001821 A1 | 1/2020 | |
| WO | 2020/177041 A1 | 9/2020 | |
| WO | 2020/246842 A1 | 12/2020 | |
| WO | 2020/256311 A1 | 12/2020 | |
| WO | 2022/120817 A1 | 6/2022 | |

OTHER PUBLICATIONS

"New WID: NR Positioning Support", 3GPP TSG RAN Meeting #83, RP-190752, Agenda Item: 9.1.1, Intel Corporation, Mar. 18-21, 2019, 6 pages.

"New SID on NR Positioning Enhancements", 3GPP TSG RAN Meeting #86, RP-193237, Agenda Item: 9.1.1, Qualcomm Incorporated, Dec. 9-12, 2019, 4 pages.

"C-V2X use cases: methodology, examples, and service level requirements", 5GAA Automative Association, White Paper, Version 1.0, Jun. 19, 2019, pp. 1-77.

"Revised SID on Study on scenarios and requirements of in-coverage, partial coverage, and out-of-coverage positioning use cases", 3GPP TSG RAN Meeting #89e, RP-201518, Agenda Item: 9.7.12, LG Electronics, Sep. 14-18, 2020, 4 pages.

"Msc-generator", Sourceforge, Retrieved on Sep. 20, 2023, Webpage available at : https://sourceforge.net/projects/msc-generator/.

"3rd Generation Partnership Project; Technical Specification Group Radio Access Network; NR; Physical channels and modulation (Release 16)", 3GPP TS 38.211, V16.4.0, Dec. 2020, pp. 1-133.

"3rd Generation Partnership Project; Technical Specification Group Radio Access Network; NR; Physical layer procedures for data (Release 16)", 3GPP TS 38.214, V16.4.0, Dec. 2020, pp. 1-169.

"3rd Generation Partnership Project; Technical Specification Group Radio Access Network; LTE Positioning Protocol (LPP) (Release 16)", 3GPP TS 37.355, V16.3.0, Dec. 2020, pp. 1-298.

"V2X Communications Message Set Dictionary", Society of Automotive Engineers, SAE J2735, Jul. 2020, 3 pages.

"IEEE 802.11", Wikipedia, Retrieved on Sep. 20, 2023, Webpage available at : https://en.wikipedia.org/wiki/IEEE_802.11.

International Search Report and Written Opinion received for corresponding Patent Cooperation Treaty Application No. PCT/CN2021/079435, dated Dec. 2, 2021, 9 pages.

"Discussion on sidelink resource allocation enhancements in mode2", 3GPP TSG-RAN WG2 Meeting #112 electronic, R2-2009869, Agenda item: 8.15.3, Lenovo, Nov. 2-13, 2020, pp. 1-4.

* cited by examiner

600

630

700

MECHANISM FOR SIDELINK POSITIONING

RELATED APPLICATION

This application was originally filed as PCT Application No. PCT/CN2021/079435, filed on Mar. 6, 2021, of which is incorporated herein by reference in its entirety.

FIELD

Embodiments of the present disclosure generally relate to the field of telecommunication and in particular, to methods, devices, apparatuses and computer readable storage medium for sidelink positioning.

BACKGROUND

With developments of communication systems, new technologies have been proposed. Terminal devices can set up a sidelink with each other to allow direction communications between them. For a group of terminal devices, the sidelink communication may comprise unicast communication, groupcast communication and broadcast communication. The terminal devices may measure the reference signal time difference (RSTD) between positioning reference signals (PRSs) from different transmission points in order to perform positioning.

SUMMARY

In general, example embodiments of the present disclosure provide a solution for sidelink positioning.

In a first aspect, there is provided a first device. The first device comprises at least one processor; and at least one memory including computer program codes; the at least one memory and the computer program codes are configured to, with the at least one processor, cause the first device to: receive, from a set of second devices, information indicating that the set of second devices are capable of assisting with sidelink positioning of the first device, the information further comprising assistance information assisting with the sidelink positioning; and transmit a set of positioning reference references to a subset of second devices which are determined from the set of second devices based at least in part on the assistance information to assist with the sidelink positioning of the first device.

In a second aspect, there is provided a second device. The second device comprises at least one processor; and at least one memory including computer program codes; the at least one memory and the computer program codes are configured to, with the at least one processor, cause the second device to: transmit, to a first device, information indicating that the second device is capable of assisting with sidelink positioning of the first device, the information further comprising assistance information of the second device for assisting with the sidelink positioning; and receive a positioning reference signal from the first device.

In a third aspect, there is provided a method. The method comprises receiving, at a first device and from a set of second devices, information indicating that the set of second devices are capable of assisting with sidelink positioning of the first device, the information further comprising assistance information of the set of second devices for assisting with the sidelink positioning; and transmitting a set of positioning reference references to a subset of second devices which are determined from the set of second devices based at least in part on the assistance information to assist with the sidelink positioning of the first device.

In a fourth aspect, there is provided a method. The method comprises transmitting, at a second device and to a first device, information indicating that the second device is capable of assisting with sidelink positioning of the first device, the information further comprising assistance information of the second device for assisting with the sidelink positioning; and receiving a positioning reference signal from the first device.

In a fifth aspect, there is provided an apparatus. The apparatus comprises means for receiving, at a first device and from a set of second devices, information indicating that the set of second devices are capable of assisting with sidelink positioning of the first device, the information further comprising assistance information of the set of second devices for assisting with the sidelink positioning; and means for transmitting a set of positioning reference references to a subset of second devices which are determined from the set of second devices based at least in part on the assistance information to assist with the sidelink positioning of the first device.

In a sixth aspect, there is provided an apparatus. The apparatus comprises means for transmitting, at a second device and to a first device, information indicating that the second device is capable of assisting with sidelink positioning of the first device, the information further comprising assistance information of the second device for assisting with the sidelink positioning; and means for receiving a positioning reference signal from the first device.

In a seventh aspect, there is provided a computer readable medium. The computer readable medium comprises program instructions for causing an apparatus to perform at least the method according to any one of the above third and fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
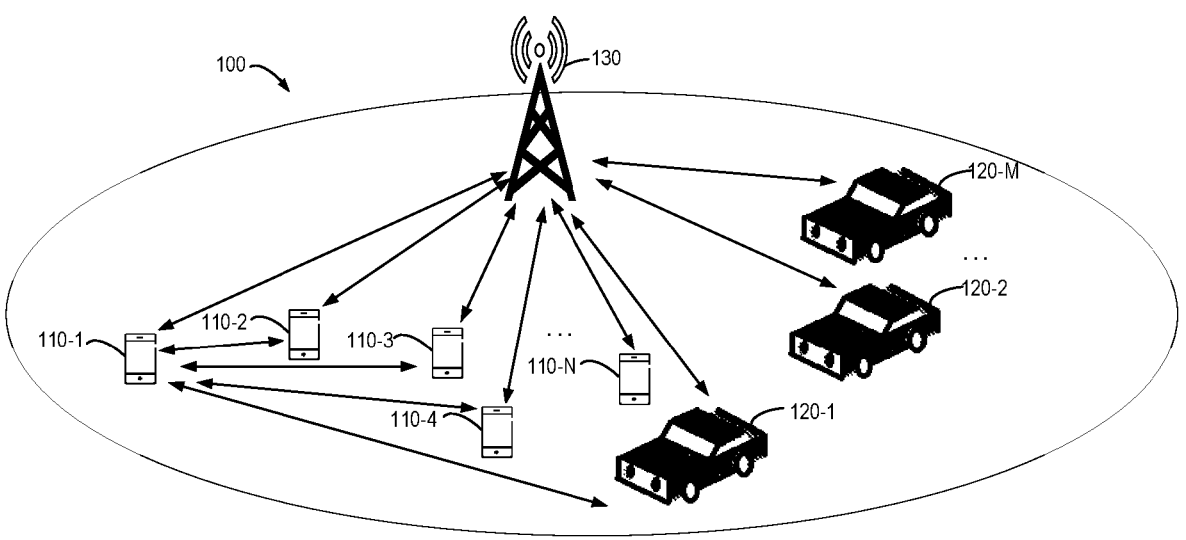
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. The term "terminal device" refers to any end device that may be capable of wireless communication. In the following description, the terms "terminal device", "terminal", "user equipment" and "UE" may be used interchangeably.

A recent study item has been conducted in the third generation partner project (3GPP) for positioning support in new radio (NR) system. A follow up work item has started to specify positioning support. As the output of the study item phase, it was recommended that the following positioning solutions be specified for NR Release (Rel)-16: downlink Time Difference of Arrival (DL-TDOA); uplink Time Difference of Arrival (UL-TDOA); downlink Angle of Departure (DL-AoD); uplink Angle of Arrival (UL-AoA); and multi-cell Round Trip Time (Multi-RTT).

The new reference signal for positioning has been introduced in downlink as part of the work item. The terminal devices may measure the RSTD between PRSs from different transmission points in order to perform positioning.

Alternatively or in addition, the terminal devices can measure a receiving-transmitting (Rx-Tx) time difference where the time difference is between two PRSs.

In addition to the release-16 work to include support for the above positioning methods it is expected that positioning enhancements will continue in future releases. One of the key enhancements for future NR releases that is under discussion is support for sidelink positioning of UEs, i.e. vehicle-to-everything (V2X) or On Board Units (OBU) in vehicles.

In release 17, there will be further work on NR positioning with the main target being the Industrial internet of thing (IoT) use cases. In release 16, support for vehicle-to-everything (V2X) was also added to NR in the form of sidelink communications. Enhancements to the sidelink are also being made in release 17. As of yet positioning support has not been added to the sidelink and the positioning work has kept sidelink explicitly out of the scope of the work. However, many sidelink use cases have positioning requirements (for example, self driving cars and public safety).

5G Automotive Association (5GAA) has studied the different positioning technologies that may be used to meet the accuracy requirements in V2X applications. Sidelink positioning has been identified as important to meet high accuracy use cases, especially when Global Navigation Satellite System (GNSS) coverage is not available. Radio Access Network (RAN) plenary has initiated a study item to identify the use cases and requirements of V2X and sidelink positioning. Three main scenarios for V2X are in coverage, partial coverage, and out of coverage.

In V2X, Basic Safety Message (BSM) has been defined which allow vehicle to exchange information at a periodicity of 100 ms. There are two parts to the BSM: BSM Part 1 which contains the core data elements and is transmitted approximately 10× per second; and BSM Part 2 which is added depending upon events and contains a variable set of data elements drawn from many optional data elements.

In release 16 and release 17, timing based positioning techniques (for example, DL-TDOA and multi-RTT) rely on multiple positioning reference signals (PRS) being received at the same time by the target UE. Ranging or RTT technique seems like the simplest method to add for V2X positioning. Ranging or RTT techniques rely on the target device transmitting a signal to a supporting device and then later receiving another reference signal from the supporting device in order to estimate the round trip time (RTT). During the RTT procedure, the target device can measure the RSTD between the two reference signals. In addition, the target device can also measure a Rx-Tx time difference between the two reference signals. In order to find the absolute position of a target UE through RTT estimation at least 3 supporting devices need to be involved.

For this RTT procedure to work properly with multiple supporting UEs (S-UEs), a natural question is how to coordinate the resource allocation. The RTT procedure also needs to be low latency as this is another key requirement for positioning applications (high speed UEs need to update the position frequently for it to be useful).

In partial and out of coverage scenarios, a gNB doesn't have an ability to centrally allocate the resources for the RTT procedure. One major problem in the sidelink RTT method shown below is how to select the appropriate S-UEs. The T-UE should ideally select S-UEs which allow it to position itself very accurately. Selecting 3 S-UEs which have a poor Geometric Dilution of Precision (GDOP), for example, would lead to very poor performance.

In order to solve at least part of the above problems, a solution for sidelink positioning is proposed. According to embodiments of the present disclosure, a second device transmits information related to sidelink positioning to a first device. The information indicates that the second device is able to assist with the sidelink positioning and comprises assistance information for the sidelink positioning. The first device selects at least one proper device for the sidelink positioning based on the assistance information. In this way, it improves accuracy of the sidelink positioning.

FIG. 1 illustrates a schematic diagram of a communication environment 100 in which embodiments of the present disclosure can be implemented. The communication environment 100, which is a part of a communication network, further comprises a terminal device 110-1, a terminal device 110-2, . . . , a terminal device 110-N, which can be collectively referred to as "terminal device(s) 110." The communication environment 100 can comprise a vehicle 120-1, a vehicle 120-2, a vehicle 120-2, . . . , a vehicle 120-M, which can be collectively referred to as "vehicle(s) 120." The communication environment 100 can also comprise a network device 130.

The communication environment 100 may comprise any suitable number of devices. In the communication environment 100, the terminal device 110 and the vehicle 120 can communicate data and control information to each other. The terminal devices 110 can communicate with each other and the vehicles 120 can communicate with each other. A link from the network device 130 to the terminal device 110 is referred to as a downlink (DL), while a link from the terminal device 110 to the network device 120 is referred to as an uplink (UL). A link between two terminal devices is referred to as a sidelink (SL). A link between two vehicles is also referred to as a SL and a link between a terminal device and a vehicle is referred to as a SL as well.

It is to be understood that the number of devices and cells and their connections shown in FIG. 1 is given for the purpose of illustration without suggesting any limitations. The communication environment 100 may include any suitable number of devices and networks adapted for implementing embodiments of the present disclosure.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
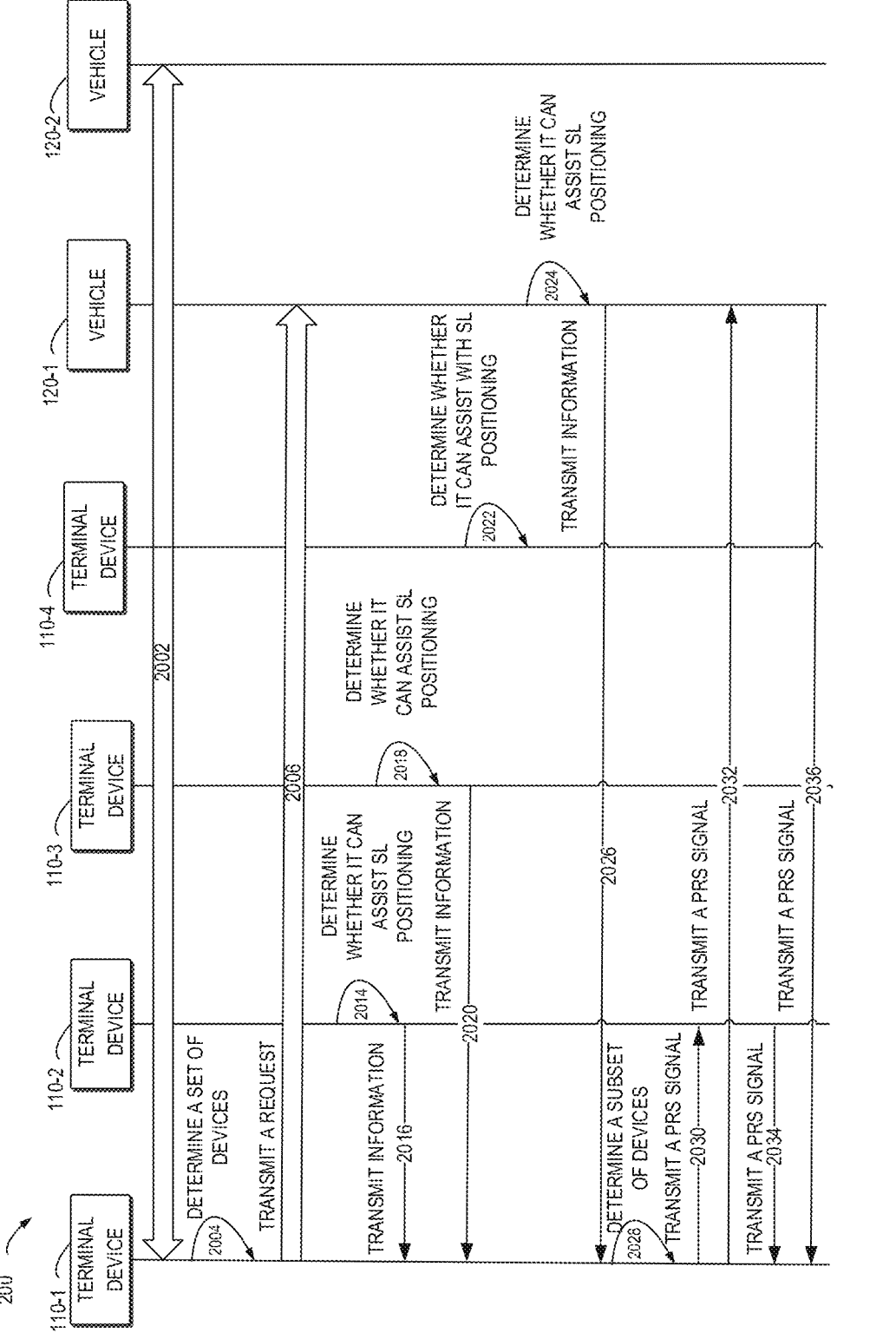
FIG. 2 illustrates a signaling flow for paging according to some example embodiments of the present disclosure.

Example embodiments of the present disclosure will be described in detail below with reference to the accompanying drawings. Reference is now made to FIG. 2, which illustrates a signaling flow 200 for paging according to example embodiments of the present disclosure. For the purpose of discussion, the signaling flow 200 will be described with reference to FIG. 1. The signaling flow 200 may involve a first device and a set of second devices which is capable of communicating with the first device. The first device can be any devices capable of sidelink communication. For example, the first device can be a terminal device or a vehicle. The second device can be any suitable devices that are able to communicate with the first device. For example, the second device can be a terminal device or a vehicle. Alternatively, the second device can be a road side unit. In some example embodiments, the second device can a network device, for example, the network device 130. Only for the purpose of illustrations, the terminal device 110-1 is taken as an example of the first device and the second devices comprise the terminal device 110-2, the terminal device 110-3, the terminal device 110-4, the vehicle 120-1, and the vehicle 120-2. It should be noted that the second device can comprise any proper devices.

In some example embodiments, the terminal device 110-1 can exchange 2002 basic safety message (BSM) information with the plurality of devices. For example, the BSM information can refer to SAE J2735 BSM. In some example embodiments, the device(s) (for example, the terminal devices 110-2, 110-3 and 110-4 and the vehicles 120-1 and 120-2) can broadcast the BSM information to the terminal device 110-1. The terminal device 110-1 can also broadcast its BSM information to the second device(s). In some example embodiments, the BSM information can be broadcasted periodically. The BSM information can comprise core data elements. For example, if the device is configured with a global positioning system (GPS), the BSM information can comprise position information of the device. The BSM information can also comprise speed information of the corresponding device. In other embodiments, the BSM information may comprise heading acceleration of the corresponding device. Alternatively or in addition, the BSM information can comprise information regarding brake system status of the corresponding device. In a yet embodiment, the BSM information can comprise information regarding position accuracy of the corresponding device. In other embodiments, if the device is a vehicle, the BSM information may comprise a vehicle size of the corresponding device. It should be noted that the BSM information can comprise any suitable information.

In some example embodiments, the terminal device 110-1 can determine 2004 a set of devices from a plurality of devices based on the BSM information. The set of devices can comprise any suitable number of devices. For example, the set of devices can comprise one device. Alternatively, the set of devices can comprise a plurality of devices. In some example embodiments, the terminal device 110-1 can determine the set of devices to minimize geometric dilution of precision (GDOP). For example, the terminal device 110-1 can determine the set of devices based on location information in the BSM information to ensure that the devices in the set of devices are not in a line. Alternatively or in addition, if a position accuracy of the device indicated in the BSM information exceeds a threshold accuracy, the terminal device 110-1 can select the device to be one of the set of devices. In other embodiments, the terminal device 110-1 can measure a reference signal received power (RSRP) based on the BSM information. If the measured RSRP of the device exceeds a threshold RSRP, the terminal device 110-1 can determined the device to be in the set of devices. In some example embodiments, the threshold RSRP may be indicated in the BSM information. The terminal device 110-1 can determine the set of devices based on any proper data elements in the BSM information. Only as an example, as shown in FIG. 2, the determined set of devices can comprise the terminal devices 110-2-110-4 and the vehicle 120-1. By way of example, if the vehicles 120-1 and 120-2, the terminal device 110-1 may select the vehicle 120-1 and may not select the vehicle 120-2. In other embodiments, if the position accuracy of the vehicle 120-2 is below the threshold accuracy, the vehicle 120-2 may not be selected.

The terminal device 110-1 may broadcast/groupcast 2006 a request for assisting with SL positioning of the terminal device 110-1 to the set of devices. In other embodiments, the terminal device 110-1 can also transmit the request for assisting with SL positioning to other device(s) which does/ do not belong to the determined set of devices. In some example embodiments, the request can comprise criteria for assisting with the SL positioning. For example, the criteria can indicate a signal strength for assisting with SL positioning. Alternatively or in addition, the criteria can indicate line of sight (LOS). The criteria may comprise other parameters for assisting with SL positioning. Only as an example, as shown in FIG. 2, since the vehicle 120-2 is not selected by the terminal device 110-1, the request for assisting with SL positioning may not be transmitted to the vehicle 120-2.

The terminal device 110-2 can determine 2014 whether it can assist SL positioning. In some example embodiments, the terminal device 110-2 can measure a RSRP from the terminal device 110-1. For example, if the RSRP exceeds a threshold RSRP, the terminal device 110-2 can determine that it can assist SL positioning. In some example embodiments, the threshold RSRP can be included in the criteria transmitted by the terminal device 110-1. Alternatively, the threshold RSRP can be determined by the terminal device 110-2 locally. In some example embodiments, the terminal device 110-2 can measure a reference signal received quality (RSRQ) from the terminal device 110-1. For example, if the RSRQ exceeds a threshold RSRQ, the terminal device 110-2 can determine that it can assist SL positioning. In some example embodiments, the threshold RSRQ can be included in the criteria transmitted by the terminal device 110-1. Alternatively, the threshold RSRP can be determined by the terminal device 110-2 locally.

In some example embodiments, the terminal device 110-2 can measure angle of arrival (AoA) between the terminal device 110-1 and the terminal device 110-2. In some embodiments, the AoA can be a relative AoA. Alternatively, the AoA can be an absolute AoA. For example, if the measured AoA is out of AoA range received from the terminal device 110-1, the terminal device 110-2 can determine that it can assist SL positioning. In some example embodiments, the threshold AoA can be included in the criteria transmitted by the terminal device 110-1. Alternatively, the threshold AoA can be determined by the terminal device 110-2 locally.

Alternatively or in addition, the terminal device 110-2 can determine its LoS status from the terminal device 110-1. In some embodiments, the LoS status can be a probability of LoS. For example, if the probability of LoS is below a threshold probability, the terminal device 110-2 can determine that it can assist SL positioning. In some example embodiments, the threshold probability can be included in the criteria transmitted by the terminal device 110-1. Alternatively, the threshold probability can be determined by the terminal device 110-2 locally. Alternatively or in addition, the terminal device 110-2 can determine its non LoS (NLoS) status from the terminal device 110-1. In some embodiments, the NLoS status can be a probability of NLoS. For example, if the probability of NLoS is above a threshold probability, the terminal device 110-2 can determine that it can assist SL positioning. In some example embodiments, the threshold probability can be included in the criteria transmitted by the terminal device 110-1. Alternatively, the threshold probability can be determined by the terminal device 110-2 locally.

In other embodiments, if a traffic load at the terminal device 110-2 exceeds a threshold traffic load, the terminal device 110-2 can determine that it can assist SL positioning. In some example embodiments, the threshold traffic load can be included in the criteria transmitted by the terminal device 110-1. Alternatively, the threshold traffic load can be determined by the terminal device 110-2 locally. In another embodiment, the terminal device 110-2 can determine whether it can assist the SL positioning based on its power consumption requirement. For example, if the power consumption requirement indicates that the terminal device 110-2 should save power, the terminal device 110-2 can determine not to assist the SL positioning. Alternatively, if the power consumption requirement does not indicate that the terminal device 110-2 should save power, the terminal device 110-2 can determine to assist the SL positioning.

The terminal device 110-2 can transmit 2016 information to the terminal device 110-1. For example, if the terminal device 110-2 determines that it can assist the SL positioning, the terminal device 110-2 can transmit the information. Alternatively the terminal device 110-2 can transmit the information without receiving the request. The information indicates that the terminal device 110-2 is capable of assisting with the SL positioning of the terminal deice 110-1. In some example embodiments, the information can be transmitted in a physical sidelink control channel (PSCCH). In addition, the information also indicates assistance information of the terminal device 110-2 to assist with the SL positioning of the terminal deice 110-1. In some example embodiments, the assistance information may comprise an antenna configuration of the terminal device 110-2. For example, the assistance information can indicate the number of antennas at the terminal device 110-2. Alternatively or in addition, the assistance information can comprise a panel selection of the terminal device 110-2. By way of example, if the terminal device 110-2 has a plurality of panels, the terminal device 110-2 may select a panel for the SL positioning and include the selected panel into the assistance information. In other embodiments, the assistance information can comprise a movement status of the terminal device 110-2. The term "movement status" used herein can represent whether the device is a mobile device or stationary device and optionally the velocity of the device. For example, the assistance information can indicate whether the terminal device 110-2 is a moving device (for example, a vehicle) or a stational device (for example, a road side unit). Additionally, the assistance information can also comprise the AoA measured by the terminal device 110-2 or the LoS status of the terminal device 110-2. In this way, it can improve positioning estimation process.

The terminal device 110-3 can determine 2018 whether it can assist SL positioning. The terminal device 110-3 can determine whether it can assist SL positioning in a similar way as the terminal device 110-1. In some example embodiments, the terminal device 110-3 can measure a RSRP from the terminal device 110-1. For example, if the RSRP exceeds a threshold RSRP, the terminal device 110-3 can determine that it can assist SL positioning. In some example embodiments, the threshold RSRP can be included in the criteria transmitted by the terminal device 110-1. Alternatively, the threshold RSRP can be determined by the terminal device 110-3 locally. In some example embodiments, the terminal device 110-3 can measure a RSRQ from the terminal device 110-1. For example, if the RSRQ exceeds a threshold RSRQ, the terminal device 110-3 can determine that it can assist SL positioning. In some example embodiments, the threshold RSRQ can be included in the criteria transmitted by the terminal device 110-1. Alternatively, the threshold RSRP can be determined by the terminal device 110-3 locally.

In some example embodiments, the terminal device 110-3 can measure AoA between the terminal device 110-1 and the terminal device 110-3. For example, if the AoA exceeds a threshold AoA, the terminal device 110-3 can determine that it can assist SL positioning. In some example embodiments, the threshold AoA can be included in the criteria transmitted by the terminal device 110-1. Alternatively, the threshold AoA can be determined by the terminal device 110-3 locally.

Alternatively or in addition, the terminal device 110-3 can determine its LoS status from the terminal device 110-1. For example, if the LoS status matches with a predetermined LoS status, the terminal device 110-3 can determine that it can assist SL positioning. In some example embodiments, the predetermined LoS status can be included in the criteria transmitted by the terminal device 110-1. Alternatively, the predetermined LoS status can be determined by the terminal device 110-3 locally.

In other embodiments, if a traffic load at the terminal device 110-3 exceeds a threshold traffic load, the terminal device 110-3 can determine that it can assist SL positioning. In some example embodiments, the threshold traffic load can be included in the criteria transmitted by the terminal device 110-1. Alternatively, the threshold traffic load can be determined by the terminal device 110-3 locally. In another embodiment, the terminal device 110-3 can determine whether it can assist the SL positioning based on its power consumption requirement. For example, if the power consumption requirement indicates that the terminal device 110-3 should save power, the terminal device 110-3 can determine not to assist the SL positioning. Alternatively, if the power consumption requirement does not indicate that the terminal device 110-3 should save power, the terminal device 110-3 can determine to assist the SL positioning.

The terminal device 110-3 can transmit 2020 information to the terminal device 110-1. For example, if the terminal device 110-3 determines that it can assist the SL positioning, the terminal device 110-3 can transmit the information. Alternatively the terminal device 110-3 can transmit the information without receiving the request. The information indicates that the terminal device 110-3 is capable of assisting with the SL positioning of the terminal deice 110-1. In some example embodiments, the information can be transmitted in a PSCCH. In addition, the information also indicates assistance information of the terminal device 110-3 to assist with the SL positioning of the terminal deice 110-1. In some example embodiments, the assistance information may comprise an antenna configuration of the terminal device 110-3. For example, the assistance information can indicate the number of antennas at the terminal device 110-3. Alternatively or in addition, the assistance information can comprise a panel selection of the terminal device 110-3. By way of example, if the terminal device 110-3 has a plurality of panels, the terminal device 110-3 may select a panel for the SL positioning and include the selected panel into the assistance information. In other embodiments, the assistance information can comprise a movement status of the terminal device 110-3. For example, the assistance information can indicate whether the terminal device 110-3 is a moving device (for example, a vehicle) or a stational device (for example, a road side unit). In other embodiments, the assistance information can comprise a velocity of the device. Additionally, the assistance information can also comprise the AoA range measured by the terminal device 110-3 or the LoS status of the terminal device 110-3. In this way, it can improve positioning estimation process.

The terminal device 110-4 can determine 2022 whether it can assist SL positioning. The terminal device 110-4 can determine whether it can assist SL positioning in a similar way as the terminal device 110-1. In some example embodiments, the terminal device 110-4 can measure a RSRP from the terminal device 110-1. For example, if the RSRP exceeds a threshold RSRP, the terminal device 110-4 can determine that it can assist SL positioning. In some example embodiments, the threshold RSRP can be included in the criteria transmitted by the terminal device 110-1. Alternatively, the threshold RSRP can be determined by the terminal device 110-4 locally.

In some example embodiments, the terminal device 110-4 can measure AoA between the terminal device 110-1 and the terminal device 110-4. For example, if the AoA is out of an AoA rang, the terminal device 110-4 can determine that it can assist SL positioning. In some example embodiments, the threshold AoA can be included in the criteria transmitted by the terminal device 110-1. Alternatively, the threshold AoA can be determined by the terminal device 110-4 locally.

Alternatively or in addition, the terminal device 110-4 can determine its LoS status between the terminal device 110-1 and the terminal device 110-4. In some embodiments, the LoS status can be a probability of LoS. For example, if the probability of LoS is below a threshold probability, the terminal device 110-4 can determine that it can assist SL positioning. In some example embodiments, the predetermined LoS status can be included in the criteria transmitted by the terminal device 110-1. Alternatively, the predetermined LoS status can be determined by the terminal device 110-4 locally.

In other embodiments, if a traffic load at the terminal device 110-4 exceeds a threshold traffic load, the terminal device 110-4 can determine that it can assist SL positioning. In some example embodiments, the threshold traffic load can be included in the criteria transmitted by the terminal device 110-1. Alternatively, the threshold traffic load can be determined by the terminal device 110-4 locally. In another embodiment, the terminal device 110-4 can determine whether it can assist the SL positioning based on its power consumption requirement. For example, if the power consumption requirement indicates that the terminal device 110-4 should save power, the terminal device 110-4 can determine not to assist the SL positioning. Alternatively, if the power consumption requirement does not indicate that the terminal device 110-4 should save power, the terminal device 110-2 can determine to assist the SL positioning. If the terminal device 110-4 determines that it cannot assist the SL positioning, the terminal device 110-4 may not transmit the information to the terminal device 110-1.

The vehicle 120-1 can determine 2024 whether it can assist SL positioning. The vehicle 120-1 can determine whether it can assist SL positioning in a similar way as the terminal device 110-1. In some example embodiments, the vehicle 120-1 can measure a RSRP from the terminal device 110-1. For example, if the RSRP exceeds a threshold RSRP, the vehicle 120-1 can determine that it can assist SL positioning. In some example embodiments, the threshold RSRP can be included in the criteria transmitted by the terminal device 110-1. Alternatively, the threshold RSRP can be determined by the vehicle 120-1 locally. In some example embodiments, the vehicle 120-1 can measure a RSRQ from the terminal device 110-1. For example, if the RSRQ exceeds a threshold RSRQ, the vehicle 120-1 can determine that it can assist SL positioning. In some example embodiments, the threshold RSRQ can be included in the criteria transmitted by the terminal device 110-1. Alternatively, the threshold RSRP can be determined by the vehicle 120-1 locally.

In some example embodiments, the vehicle 120-1 can measure AoA between the terminal device 110-1 and the vehicle 120-1. For example, if the AoA exceeds a threshold AoA, the vehicle 120-1 can determine that it can assist SL positioning. In some example embodiments, the threshold AoA can be included in the criteria transmitted by the terminal device 110-1. Alternatively, the threshold AoA can be determined by the vehicle 120-1 locally.

Alternatively or in addition, the vehicle 120-1 can determine its LoS status from the terminal device 110-1. For example, if the LoS status matches with a predetermined LoS status, the vehicle 120-1 can determine that it can assist SL positioning. In some example embodiments, the predetermined LoS status can be included in the criteria transmitted by the terminal device 110-1. Alternatively, the predetermined LoS status can be determined by the vehicle 120-1 locally.

In other embodiments, if a traffic load at the vehicle 120-1 exceeds a threshold traffic load, the vehicle 120-1 can determine that it can assist SL positioning. In some example embodiments, the threshold traffic load can be included in the criteria transmitted by the terminal device 110-1. Alternatively, the threshold traffic load can be determined by the vehicle 120-1 locally. In another embodiment, the vehicle 120-1 can determine whether it can assist the SL positioning based on its power consumption requirement. For example, if the power consumption requirement indicates that the vehicle 120-1 should save power, the vehicle 120-1 can determine not to assist the SL positioning. Alternatively, if the power consumption requirement does not indicate that the vehicle 120-1 should save power, the vehicle 120-1 can determine to assist the SL positioning.

The vehicle 120-1 can transmit 2026 information to the terminal device 110-1. For example, if the vehicle 120-1 determines that it can assist the SL positioning, the vehicle 120-1 can transmit the information. Alternatively the vehicle 120-1 can transmit the information without receiving the request. The information indicates that the vehicle 120-1 is capable of assisting with the SL positioning of the terminal deice 110-1. In addition, the information also indicates assistance information of the vehicle 120-1 to assist with the SL positioning of the terminal deice 110-1. In some example embodiments, the information can be transmitted in a PSCCH. In some example embodiments, the assistance information may comprise an antenna configuration of the vehicle 120-1. For example, the assistance information can indicate the number of antennas at the vehicle 120-1. Alternatively or in addition, the assistance information can comprise a panel selection of the vehicle 120-1. By way of example, if the vehicle 120-1 has a plurality of panels, the vehicle 120-1 may select a panel for the SL positioning and include the selected panel into the assistance information. In other embodiments, the assistance information can comprise a movement status of the vehicle 120-1. For example, the assistance information can indicate whether the vehicle 120-1 is a moving device (for example, a vehicle) or a stational device (for example, a road side unit). Additionally, the assistance information can also comprise the AoA measured by the vehicle 120-1 or the LoS status of the vehicle 120-1. In this way, it can improve positioning estimation process.

Figure 3:
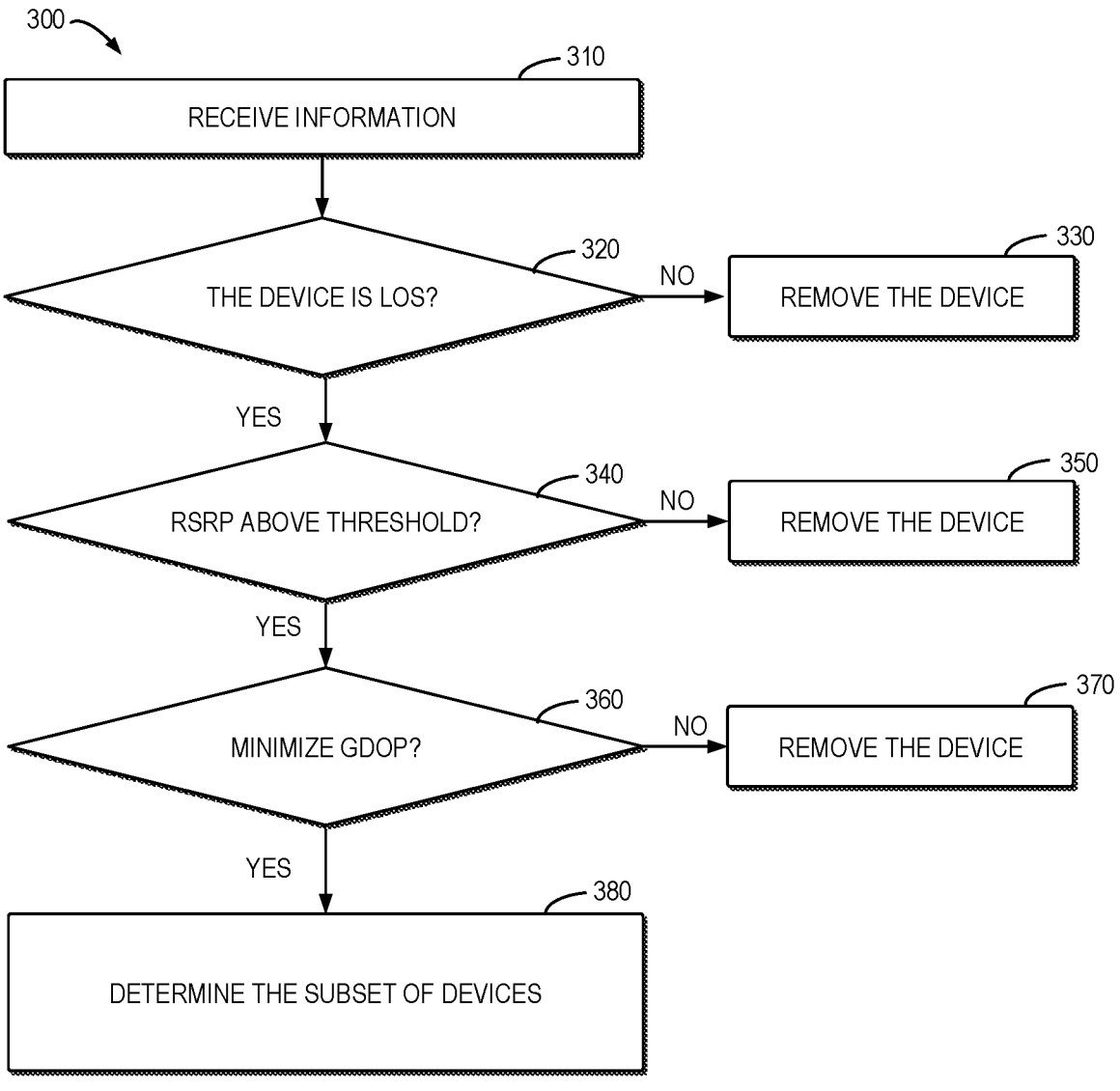
FIG. 3 illustrates a flowchart of a method implemented at a first apparatus according to some example embodiments of the present disclosure.

The terminal device 110-1 determines 2028 a subset of devices based on the assistance information received from the set of devices. FIG. 3 shows a method for determining the subset of devices according to some example embodiments of the present disclosure.

At block 310, the terminal device 110-1 can receive information from the device (for example, the terminal device 110-2). At block 320, the terminal device 110-1 can determine whether the device is LOS. If the device is not LOS, the terminal device 110-1 can remove the device from the set of devices at block 330.

If the device is LOS, the terminal device 110-1 can determine whether the RSRP of the device exceeds the threshold RSRP at block 340. In some example embodiments, the RSRP of the device can be measured by the terminal device 110-1. Alternatively, the RSRP can be comprised in the assistance information. If the RSRP does not exceed the threshold RSRP, at block 350, the terminal device 110-1 can remove the device from the set of devices.

If the RSRP exceeds the threshold RSRP, the terminal device 110-1 can determine whether the device can minimize GDOP at block 360. If the device cannot minimize GDOP, the terminal device 110-1 can remove the device at block 370. If the device can minimize GDOP, the terminal device 110-1 can determine the device to be in the subset of devices. It should be noted that the method 300 is only an example not a limitation. The blocks 320, 340 and 360 can be taken place in a different order. The method 300 can be repeated for each device in the set of devices. For example, the method 300 can be repeated for the terminal device 110-3 and the vehicle 120-1.

Referring back to FIG. 2, the terminal device 110-1 may transmit 2030 a positioning reference signal to the terminal device 110-2 which is in the subset of devices. The terminal device 110-1 may transmit 2032 another positioning reference signal to the vehicle 120-1. The terminal device 110-2 can transmit 2034 a further positioning reference signal to the terminal device 110-1. The vehicle 120-1 can transmit 2036 another positioning reference signal to the terminal device 110-1. The terminal device 110-1 can determine a round trip time (RTT) between the terminal device 110-1 and the terminal device 110-2 based on the two positioning reference signals transmitted between the terminal devices 110-1 and 110-2. The terminal device 110-1 can determine a round trip time (RTT) between the terminal device 110-1 and the vehicle 120-1 based on the two positioning reference signals transmitted between the terminal device 110-1 and the vehicle 120-1.

According to embodiments of the present disclosure, positioning accuracy of a device can be improved. The device can select a suitable device for assisting with positioning based on assistance information, thereby improving the positioning.

Figure 4:
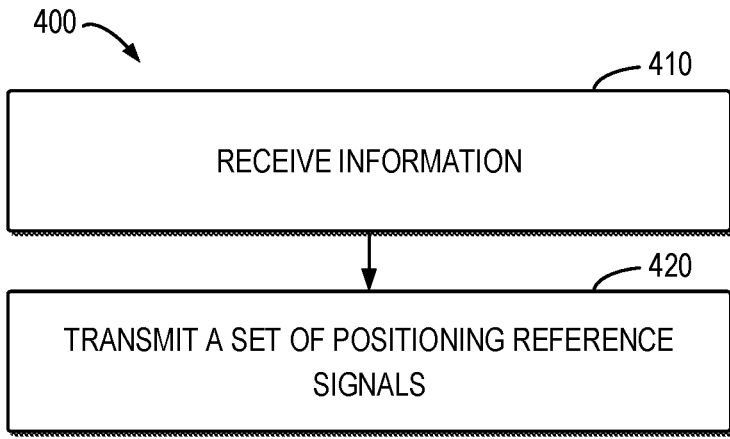
FIG. 4 illustrates a flowchart of a method implemented at a first apparatus according to some example embodiments of the present disclosure.

FIG. 4 shows a flowchart of an example method 400 implemented at a first device in accordance with some example embodiments of the present disclosure. For the purpose of discussion, the method 400 will be described from the perspective of the first device. The first device can be any proper device shown in FIG. 1, for example, the terminal device 110 or the vehicle 120. Only as an example, the first device is referred to as the terminal device 110-1.

In some example embodiments, the terminal device 110-1 can exchange basic safety message (BSM) information with the second devices. In some example embodiments, the second device(s) (for example, the terminal devices 110-2, 110-3 and 110-4 and the vehicles 120-1 and 120-2) can broadcast the BSM information to the terminal device 110-1. The terminal device 110-1 can also broadcast its BSM information to the second device(s). In some example embodiments, the BSM information can be broadcasted periodically. The BSM information can comprise core data elements. For example, if the device is configured with a global positioning system (GPS), the BSM information can comprise position information of the device. The BSM information can also comprise speed information of the corresponding device. In other embodiments, the BSM information may comprise heading acceleration of the corresponding device. Alternatively or in addition, the BSM information can comprise information regarding brake system status of the corresponding device. In a yet embodiment, the BSM information can comprise information regarding position accuracy of the corresponding device. In other embodiments, if the device is a vehicle, the BSM information may comprise a vehicle size of the corresponding device. It should be noted that the BSM information can comprise any suitable information.

In some example embodiments, the terminal device 110-1 can determine a set of devices from a plurality of devices based on the BSM information. The set of devices can comprise any suitable number of devices. For example, the set of devices can comprise one device. Alternatively, the set of devices can comprise a plurality of devices. In some example embodiments, the terminal device 110-1 can determine the set of devices to minimize geometric dilution of precision (GDOP). For example, the terminal device 110-1 can determine the set of devices based on location information in the BSM information to ensure that the devices in the set of devices are not in a line. Alternatively or in addition, if a position accuracy of the device indicated in the BSM information exceeds a threshold accuracy, the terminal device 110-1 can select the device to be one of the set of devices. In other embodiments, the terminal device 110-1 can measure a reference signal received power (RSRP) based on the BSM information. If the measured RSRP of the device exceeds a threshold RSRP, the terminal device 110-1 can determined the device to be in the set of devices. In some example embodiments, the threshold RSRP may be indicated in the BSM information. The terminal device 110-1 can determine the set of devices based on any proper data elements in the BSM information. Only as an example, as shown in FIG. 2, the determined set of devices can comprise the terminal devices 110-2-110-4 and the vehicle 120-1. By way of example, if the vehicles 120-1 and 120-2, the terminal device 110-1 may select the vehicle 120-1 and may not select the vehicle 120-2. In other embodiments, if the position accuracy of the vehicle 120-2 is below the threshold accuracy, the vehicle 120-2 may not be selected.

In some example embodiments, the terminal device 110-1 may broadcast/groupcast a request for assisting with SL positioning of the terminal device 110-1 to the set of devices. In other embodiments, the terminal device 110-1 can also transmit the request for assisting with SL positioning to other device(s) which does/do not belong to the determined set of devices. In some example embodiments, the request can comprise criteria for assisting with the SL positioning. For example, the criteria can indicate a signal strength for assisting with SL positioning. Alternatively or in addition, the criteria can indicate line of sight (LOS). The criteria may comprise other parameters for assisting with SL positioning. Only as an example, as shown in FIG. 2, since the vehicle 120-2 is not selected by the terminal device 110-1, the request for assisting with SL positioning may not be transmitted to the vehicle 120-2.

At block 410, the terminal device 110-1 can receive information from the set of devices (for example, the terminal device 110-2). The information indicates that the terminal device 110-2 is capable of assisting with the SL positioning of the terminal deice 110-1. In some example embodiments, the information can be transmitted in a physical sidelink control channel (PSCCH). In addition, the information also indicates assistance information of the terminal device 110-2 to assist with the SL positioning of the terminal deice 110-1. In some example embodiments, the assistance information may comprise an antenna configuration of the terminal device 110-2. For example, the assistance information can indicate the number of antennas at the terminal device 110-2. Alternatively or in addition, the assistance information can comprise a panel selection of the terminal device 110-2. By way of example, if the terminal device 110-2 has a plurality of panels, the terminal device 110-2 may select a panel for the SL positioning and include the selected panel into the assistance information. In other embodiments, the assistance information can comprise a movement status of the terminal device 110-2. For example, the assistance information can indicate whether the terminal device 110-2 is a moving device (for example, a vehicle) or a stational device (for example, a road side unit). Additionally, the assistance information can also comprise the AoA measured by the terminal device 110-2 or the LoS status of the terminal device 110-2. In this way, it can improve positioning estimation process.

In some example embodiments, the terminal device 110-1 can determine a subset of devices based on the assistance information received from the set of devices. At block 420, the terminal device 110-1 transmit 2030 a positioning reference signal to the subset of devices, he terminal device 110-1 can determine a round trip time (RTT) between the terminal device 110-1 and the terminal device 110-2 based on the two positioning reference signals transmitted between the terminal devices 110-1 and 110-2.

Figure 5:
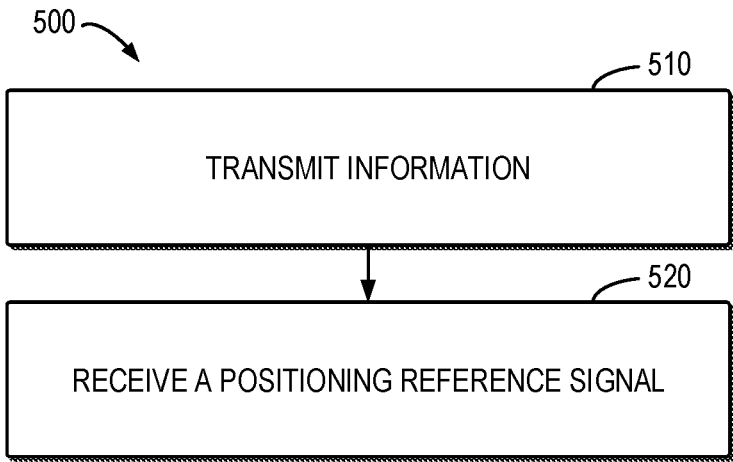
FIG. 5 illustrates a flowchart of a method implemented at a second apparatus according to some other example embodiments of the present disclosure.

FIG. 5 shows a flowchart of an example method 500 implemented at a second device in accordance with some example embodiments of the present disclosure. For the purpose of discussion, the method 500 will be described from the perspective of the device 120. The second device can be any proper device shown in FIG. 1. Only as an example, the second device is referred to as the terminal device 110-2.

In some example embodiments, the terminal device 110-2 can exchange basic safety message (BSM) information with the terminal device 110-1. In some example embodiments, the BSM information can be broadcasted periodically. The BSM information can comprise core data elements. For example, if the device is configured with a global positioning system (GPS), the BSM information can comprise position information of the terminal device 110-2. The BSM information can also comprise speed information of the terminal device 110-2. In other embodiments, the BSM information may comprise heading acceleration of the terminal device 110-2. Alternatively or in addition, the BSM information can comprise information regarding brake system status of the terminal device 110-2. In a yet embodiment, the BSM information can comprise information regarding position accuracy of the terminal device 110-2. In other embodiments, if the device is a vehicle, the BSM information may comprise a vehicle size of the terminal device 110-2. It should be noted that the BSM information can comprise any suitable information.

In some example embodiments, the terminal device 110-2 can receive a request for assisting with SL positioning of the terminal device 110-1 from the terminal device 110-1. In some example embodiments, the request can comprise criteria for assisting with the SL positioning. For example, the criteria can indicate a signal strength for assisting with SL positioning. Alternatively or in addition, the criteria can indicate line of sight (LOS). The criteria may comprise other parameters for assisting with SL positioning.

In some example embodiments, the terminal device 110-2 can determine whether it can assist SL positioning. In some example embodiments, the terminal device 110-2 can measure a RSRP from the terminal device 110-1. For example, if the RSRP exceeds a threshold RSRP, the terminal device 110-2 can determine that it can assist SL positioning. In some example embodiments, the threshold RSRP can be included in the criteria transmitted by the terminal device 110-1. Alternatively, the threshold RSRP can be determined by the terminal device 110-2 locally.

In some example embodiments, the terminal device 110-2 can measure an AoA between the terminal device 110-1 and the terminal device 110-2. For example, if the AoA exceeds a threshold AoA, the terminal device 110-2 can determine that it can assist SL positioning. In some example embodiments, the threshold AoA can be included in the criteria transmitted by the terminal device 110-1. Alternatively, the threshold AoA can be determined by the terminal device 110-2 locally.

Alternatively or in addition, the terminal device 110-2 can determine its LoS status from the terminal device 110-1. For example, if the LoS status matches with a predetermined LoS status, the terminal device 110-2 can determine that it can assist SL positioning. In some example embodiments, the predetermined LoS status can be included in the criteria transmitted by the terminal device 110-1. Alternatively, the predetermined LoS status can be determined by the terminal device 110-2 locally.

In other embodiments, if a traffic load at the terminal device 110-2 exceeds a threshold traffic load, the terminal device 110-2 can determine that it can assist SL positioning. In some example embodiments, the threshold traffic load can be included in the criteria transmitted by the terminal device 110-1. Alternatively, the threshold traffic load can be determined by the terminal device 110-2 locally. In another embodiment, the terminal device 110-2 can determine whether it can assist the SL positioning based on its power consumption requirement. For example, if the power consumption requirement indicates that the terminal device 110-2 should save power, the terminal device 110-2 can determine not to assist the SL positioning. Alternatively, if the power consumption requirement does not indicate that the terminal device 110-2 should save power, the terminal device 110-2 can determine to assist the SL positioning.

At block 510, the terminal device 110-2 transmits information to the terminal device 110-1. For example, if the terminal device 110-2 determines that it can assist the SL positioning, the terminal device 110-2 can transmit the information. Alternatively the terminal device 110-2 can transmit the information without receiving the request. The information indicates that the terminal device 110-2 is capable of assisting with the SL positioning of the terminal deice 110-1. In some example embodiments, the information can be transmitted in a physical sidelink control channel (PSCCH). In addition, the information also indicates assistance information of the terminal device 110-2 to assist with the SL positioning of the terminal deice 110-1. In some example embodiments, the assistance information may comprise an antenna configuration of the terminal device 110-2. For example, the assistance information can indicate the number of antennas at the terminal device 110-2. Alternatively or in addition, the assistance information can comprise a panel selection of the terminal device 110-2. By way of example, if the terminal device 110-2 has a plurality of panels, the terminal device 110-2 may select a panel for the SL positioning and include the selected panel into the assistance information. In other embodiments, the assistance information can comprise a movement status of the terminal device 110-2. For example, the assistance information can indicate whether the terminal device 110-2 is a moving device (for example, a vehicle) or a stational device (for example, a road side unit). Additionally, the assistance information can also comprise the AoA measured by the terminal device 110-2 or the LoS status of the terminal device 110-2. In this way, it can improve positioning estimation process.

At block 520, the terminal device 110-2 receives a positioning reference signal from the terminal device 110-1. In some example embodiments, the terminal device 110-2 can also transmit another positioning reference signal to the terminal device 110-1.

In some example embodiments, a first apparatus capable of performing any of the method 400 (for example, the first device) may comprise means for performing the respective operations of the method 400. The means may be implemented in any suitable form. For example, the means may be implemented in a circuitry or software module. The first apparatus may be implemented as or included in the first device. In some example embodiments, the means may comprise at least one processor and at least one memory including computer program code. The at least one memory and computer program code are configured to, with the at least one processor, cause performance of the apparatus.

In some example embodiments, the apparatus comprises means for receiving, from a set of second devices, information indicating that the set of second devices are capable of assisting with sidelink positioning of the first device, the information further comprising assistance information of the set of second devices for assisting with the sidelink positioning; and means for transmitting a set of positioning reference references to a subset of second devices which are determined from the set of second devices based at least in part on the assistance information to assist with the sidelink positioning of the first device.

In some example embodiments, the apparatus further comprises means for receiving basic safety message (BSM) information from a plurality of second devices; and means for determining, based on the BSM information, the set of second devices from the plurality of second devices.

In some example embodiments, the apparatus further comprises means for in accordance with a determination that the BSM information indicates locations of the plurality of second devices, determining, based on the locations, the set of second devices having Geometric Dilution of Precision (GDOP) properties above a threshold.

In some example embodiments, the apparatus further comprises means for determining, based on the BSM information, the set of second devices of which position accuracies exceed a threshold accuracy.

In some example embodiments, the apparatus further comprises means for determining, based on the BSM information, the set of second devices of which received power exceed a threshold power.

In some example embodiments, the apparatus further comprises means for transmitting, to the set of second devices, a request for assisting with the sidelink positioning, the request indicating a criteria for capability of assisting with the sidelink positioning.

In some example embodiments, the criteria comprises at least one of: a line of sight status, a reference signal received power, or an angle of arrival.

In some example embodiments, the assistance information comprises at least one of: an antenna configuration at the set of second devices, a panel selection at the set of second devices for a sidelink positioning reference signal, or a movement status of the set of second devices.

In some example embodiments, the apparatus further comprises means for receiving, from the set of second devices, further information indicating at least one of: a line of sight status between the first device and the set of second devices, or an angle of arrival range measured by the set of second devices.

In some example embodiments, the first device comprises a terminal device, and the set of second devices comprise a set of devices capable of communicating with the first device.

In some example embodiments, a second first apparatus capable of performing any of the method 500 (for example, the second device) may comprise means for performing the respective operations of the method 500. The means may be implemented in any suitable form. For example, the means may be implemented in a circuitry or software module. The first apparatus may be implemented as or included in the second device. In some example embodiments, the means may comprise at least one processor and at least one memory including computer program code. The at least one memory and computer program code are configured to, with the at least one processor, cause performance of the apparatus.

In some example embodiments, the apparatus comprises means for transmitting, to a first device, information indicating that the second device is capable of assisting with sidelink positioning of the first device, the information further comprising assistance information of the second device for assisting with the sidelink positioning; and means for receiving a positioning reference signal from the first device.

In some example embodiments, the apparatus further comprises means for transmitting basic safety message (BSM) information to the first device.

In some example embodiments, the apparatus further comprises means for receiving, from the first device, a request for assisting with the sidelink positioning, the request indicating a criteria for assisting with the sidelink positioning; and means for in accordance with a determination that the criteria is fulfilled, determining that the second device is capable of assisting with the sidelink positioning.

In some example embodiments, the criteria comprise at least one of: a line of sight status, a reference signal received power, or an angle of arrival.

In some example embodiments, the apparatus further comprises means for determining whether the second device is capable of assisting with the sidelink positioning based on at least one of: traffic load at the second device, or a power consumption requirement at the second device.

In some example embodiments, the assistance information comprises at least one of: an antenna configuration at the second device, a panel selection at the second device for a sidelink positioning reference signal, or a movement status of the second device.

In some example embodiments, the apparatus further comprises means for transmitting, to the first device, further information indicating at least one of: a line of sight status between the first device and the second device, or an angle of arrival range measured by the second device.

In some example embodiments, the first device comprises a terminal device, and the second device comprises a device capable of communicating with the first device.

Figure 6:
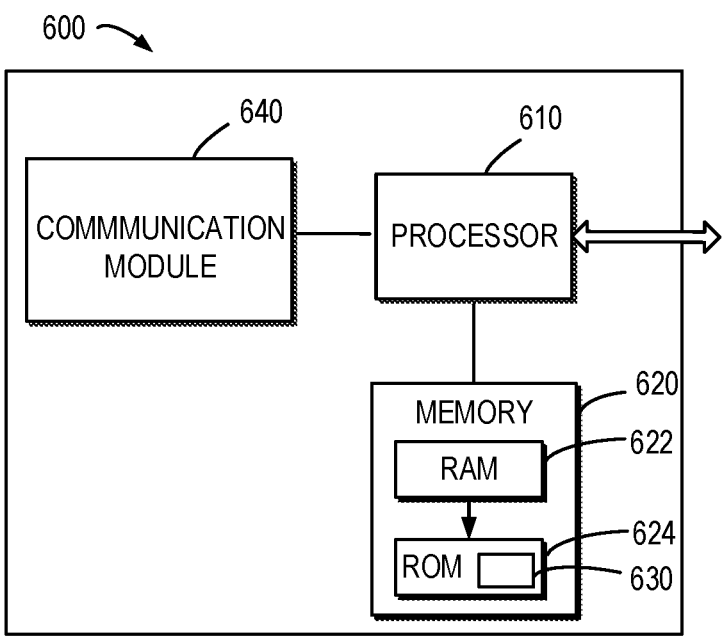
FIG. 6 illustrates a simplified block diagram of an apparatus that is suitable for implementing example embodiments of the present disclosure.

FIG. 6 is a simplified block diagram of a device 600 that is suitable for implementing example embodiments of the present disclosure. The device 600 may be provided to implement a communication device, for example, the device 110, the device 120 or the second device 130 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has one or more communication interfaces to assist with communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 630 includes computer executable instructions that are executed by the associated processor 610. The program 630 may be stored in the memory, e.g., ROM 624. The processor 610 may perform any suitable actions and processing by loading the program 630 into the RAM 622.

Example embodiments of the present disclosure may be implemented by means of the program 630 so that the device 600 may perform any process of the disclosure as discussed with reference to FIGS. 2 to 5. The example embodiments of the present disclosure may also be implemented by hardware or by a combination of software and hardware.

Figure 7:
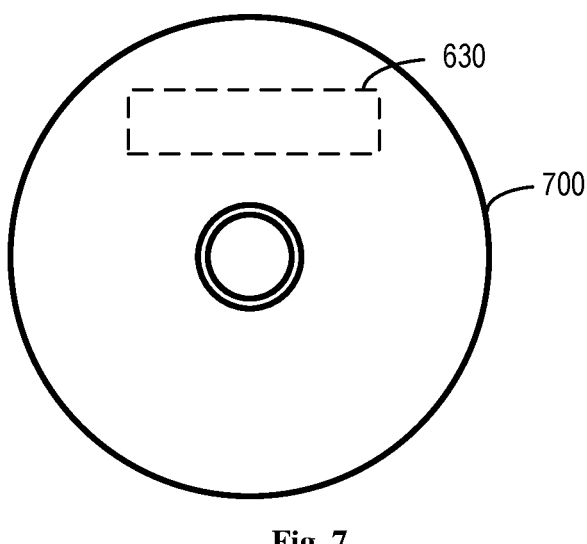
FIG. 7 illustrates a block diagram of an example computer readable medium in accordance with some example embodiments of the present disclosure.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and other magnetic storage and/or optical storage. FIG. 7 shows an example of the computer readable medium 700 in form of an optical storage disk. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 3 to 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one memory including computer program codes;
the at least one memory and the computer program codes are configured to, with the at least one processor, cause the first device to:
receive, from a set of second devices, information indicating that the set of second devices are capable of assisting with sidelink positioning of the first device, the information further comprising assistance information for assisting with the sidelink positioning, wherein the assistance information comprises at least one of:
an antenna configuration at the set of second devices,
a panel selection at the set of second devices for a sidelink positioning reference signal,
a movement status of the set of second devices, or
an angle of arrival range measured by the set of second devices; and
transmit a set of positioning reference signals to a subset of second devices which are determined from the set of second devices based at least in part on the assistance information to assist with the sidelink positioning of the first device.

2. The first device of claim 1, wherein the at least one memory and the computer program codes are configured to, with the at least one processor, further cause the first device to:
receive basic safety message information from a plurality of second devices; and
determine, based on the basic safety message information, the set of second devices from the plurality of second devices.

3. The first device of claim 2, wherein the at least one memory and the computer program codes are configured to, with the at least one processor, further cause the first device to:
in accordance with a determination that the basic safety message information indicates locations of the plurality of second devices, determine, based on the locations, the set of second devices meeting at least one of the following:
geometric dilution of precision properties of the set of second devices exceeding a threshold,
position accuracies of the set of second devices exceeding a threshold accuracy,
received power of the set of second devices exceeding a threshold power; or
received signal quality of the set of second device exceeding a threshold quality.

4. The first device of claim 2, wherein the at least one memory and the computer program codes are configured to, with the at least one processor, further cause the first device to:
transmit, to the set of second devices, a request for assisting with the sidelink positioning, the request indicating a criteria for capability of assisting with the sidelink positioning.

5. The first device of claim 4, wherein the criteria comprise at least one of:
a line of sight status,
a reference signal received power, or
an angle of arrival range.

6. The first device of claim 1, wherein the assistance information further comprises:
a line of sight status between the first device and the set of second devices.

7. A second device comprising:
at least one processor; and
at least one memory including computer program codes;
the at least one memory and the computer program codes are configured to, with the at least one processor, cause the second device to:
transmit, to a first device, information indicating that the second device is capable of assisting with sidelink positioning of the first device, the information further comprising assistance information for assisting with the sidelink positioning, wherein the assistance information comprises at least one of:
an antenna configuration at the set of second devices,
a panel selection at the set of second devices for a sidelink positioning reference signal,
a movement status of the set of second devices, or
an angle of arrival range measured by the set of second devices; and
receive a positioning reference signal from the first device.

8. The second device of claim 7, wherein the at least one memory and the computer program codes are configured to, with the at least one processor, further cause the second device to:
transmit basic safety message information to the first device.

9. The second device of claim 7, wherein the at least one memory and the computer program codes are configured to, with the at least one processor, further cause the second device to:
receive, from the first device, a request for assisting with the sidelink positioning, the request indicating a criteria for capability of assisting with the sidelink positioning; and
in accordance with a determination that the criteria is fulfilled, determine that the second device is capable of assisting with the sidelink positioning.

10. The second device of claim 9, wherein the criteria comprise at least one of:

a line of sight status, a reference signal received power, or an angle of arrival range.

11. The second device of claim 7, wherein the at least one memory and the computer program codes are configured to, with the at least one processor, further cause the second device to:

determine whether the second device is capable of assisting with the sidelink positioning based on at least one of:

traffic load at the second device, or a power consumption requirement at the second device.

12. The second device of claim 7, wherein the assistance information further comprises a line of sight status between the first device and the second device.

13. A method, comprising:

receiving, at a first device and from a set of second devices, information indicating that the set of second devices are capable of assisting with sidelink positioning of the first device, the information further comprising assistance information for assisting with the sidelink positioning, wherein the assistance information comprises at least one of:

an antenna configuration at the set of second devices, a panel selection at the set of second devices for a sidelink positioning reference signal, a movement status of the set of second devices, or an angle of arrival range measured by the set of second devices; and transmitting a set of positioning reference signals to a subset of second devices which are determined from the set of second devices based at least in part on the assistance information to assist with the sidelink positioning of the first device.

14. The method of claim 13, further comprising:

receiving basic safety message information from a plurality of second devices; and determining, based on the basic safety message information, the set of second devices from the plurality of second devices.

15. The method of claim 14, further comprising:

in accordance with a determination that the BSM information indicates locations of the plurality of second devices, determining, based on the locations, the set of second devices meeting at least one of the following:

geometric dilution of precision properties of the set of second devices exceeding a threshold, position accuracies of the set of second devices exceeding a threshold accuracy, received power of the set of second devices exceeding a threshold power, or received signal quality of the set of second devices exceeding a threshold quality.

16. The method of claim 14, further comprising:

transmitting, to the set of second devices, a request for assisting with the sidelink positioning, the request indicating a criteria for capability of assisting with the sidelink positioning.

17. The method of claim 16, wherein the criteria comprise at least one of:

a line of sight status, a reference signal received power, or an angle of arrival range.

18. The method of claim 13, wherein the assistance information further comprises a line of sight status between the first device and the set of second devices.

* * * * *